United States Patent [19]

Martin et al.

[11] Patent Number: 4,823,942
[45] Date of Patent: Apr. 25, 1989

[54] ELECTRICALLY CONDUCTIVE DOCUMENT TRANSPORT BELT

[75] Inventors: Billy P. Martin; Larry D. Goettsch, both of Lincoln, Nebr.

[73] Assignee: The Goodyear Tire & Rubber Company, Akron, Ohio

[21] Appl. No.: 88,175

[22] Filed: Aug. 21, 1987

Related U.S. Application Data

[63] Continuation-in-part of Ser. No. 457,552, Jan. 13, 1983, abandoned.

[51] Int. Cl.$^4$ .............................................. B65G 15/34
[52] U.S. Cl. .................................... 198/847; 271/193; 271/208; 271/275; 361/212
[58] Field of Search ...................... 198/847, 691, 846; 271/193, 18.1, 18.2, 275, 198, 208; 361/212

[56] References Cited

U.S. PATENT DOCUMENTS

| | | | |
|---|---|---|---|
| 3,063,884 | 11/1962 | Grover et al. | 198/847 |
| 3,482,676 | 12/1969 | Fackler | 198/847 |
| 3,533,692 | 10/1970 | Blanchette et al. | 355/16 |
| 4,119,849 | 10/1978 | Verlinden et al. | 250/315 A |
| 4,158,682 | 6/1979 | Price et al. | 264/40.4 |
| 4,208,696 | 6/1980 | Lindsay et al. | 361/212 |
| 4,256,249 | 3/1981 | Konno et al. | 226/181 |
| 4,287,984 | 9/1981 | Okamoto et al. | 271/275 |
| 4,314,006 | 2/1982 | Lentz et al. | 271/3 |
| 4,360,627 | 11/1982 | Okado et al. | 524/496 |

FOREIGN PATENT DOCUMENTS

| | | | |
|---|---|---|---|
| 0013185 | 1/1979 | Japan | 198/691 |
| 0144664 | 11/1979 | Japan | 271/275 |

Primary Examiner—Joseph E. Valenza
Attorney, Agent, or Firm—M. R. Dion, Sr.

[57] ABSTRACT

A static conductive document transport belt for use in electrostatic copiers, photosensitive copiers, and paper collating devices. The composite belt is made from an ethylene-propylene copolymer or terpolymer rubber with an electrically conductive inner layer containing conductive carbon black and an outer layer which is light reflective.

7 Claims, 1 Drawing Sheet

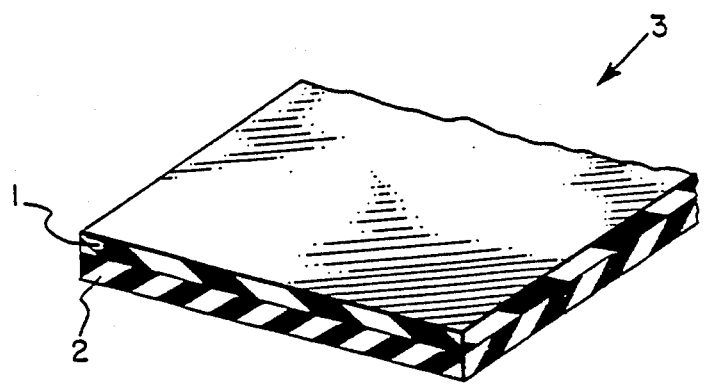

ELECTRICALLY CONDUCTIVE DOCUMENT TRANSPORT BELT

This application is a continuation-in-part of Ser. No. 457,552 filed 1-13-83 now abandoned.

BACKGROUND OF THE INVENTION

This invention relates to a self-grounding document transport system belt and more particularly to a document transport belt used in such a system having a light reflective outer layer and an electrically conductive inner layer.

BACKGROUND ART

In devices which utilize rubber or plastic belts in conjunction with mechanical drive means for the movement of paper and documents from one position to another, the movement of the transport belt relative to other parts of the apparatus builds a static electric charge on the rubber or plastic belt. The static charge makes the separation of the paper or document from the belt difficult. Such static charge build-up limits the speed at which such transport devices can be operated and thus limits the speed of operation of the device. In devices such as electrostatic or photosensitive copiers, such limitations on speed of document or paper feeding is of primary importance to the performance and desirability of such copy machines.

In photosensitive or electrostatic copying devices the document transport belt should be highly light reflective in order to present an acceptable backdrop for the document at the image making station. The light reflective character of the transport belt surface must be maintained over time despite the exposure of such transport belts to mechanical stress and degradation, oxidative degradation, ozone and ultraviolet light exposure over long periods of operation.

It is known in the art that certain rubber polymers can be formed into a document transport belt which exhibits acceptable initial properties such as the coefficient of friction and degree of light reflectivity. Synthetic polyisoprene belts with special low sulfur cure systems are known to give an acceptable initial coefficient of friction. Such belts exhibit higher resistance to degradation due to mechanical stress. However, such synthetic polyisoprene belts cannot be effectively protected against ozone degradation without sacrificing the desirable light reflective white surface. Ozone degradation causes fine cracks to develop in the surface. These cracks degrade the mechanical properties of the belt and pick up dirt and discoloration on the surface of the document feed belt.

A rubber document transport belt is known which incorporates ethylene, propylene, diene rubber (EPDM) polymers compounded with fillers and whitening agents such as titanium dioxide. These EPDM transport belts exhibit excellent resistance to environmental attack from oxygen, and ozone as well as mechanical degradation of the belt properties. The deficiency of the EPDM belts known in the art in high speed electrostatic or photosensitive copiers is that such belts are not electrically conductive due to the inherent insulating properties of the EPDM polymer. As a result excessive static build up develops during prolonged high speed copying operations. One known approach to the static charge build up problem has been to utilize a two layer construction where the outer layer is composed of a flexible light reflective material such as white polychloroprene rubber and a second inner layer formed from a flexible electrically conductive material such as graphite impregnated polychloroprene rubber. Polychloroprene has moderate resistance to environmental attack but it does degrade on exposure to ultraviolet light, heat and oxygen. The degradation causes the surface to turn brown, thus reducing the light reflectivity of the surface. In addition ozone attack causes tiny cracks to appear in the surface. These cracks would collect dirt and further decrease the light reflectivity. The use of graphite as a conductive material in the inner layer produces an inner layer which exhibits poor abrasion resistance and inadequate physical properties such as ultimate tensile strength and elongation. In addition, the inner static conducting layer utilizing graphite with its poor abrasion characteristics would have a tendency to be worn and abraded away by the mechanical drive means and roller assemblies supporting such belt in the document drive apparatus. This abrasion problem would become more pronounced as the polymer physically degraded upon exposure to the oxygen, heat, ozone, U.V. light during prolonged copier operation. The abraded particles would accumulate inside of the copier apparatus causing discoloration of the upper belt surface, masking of the imaging apparatus and accumulation in mechanical drive portions of the copying device. The document transport belts as known in the art were deficient either in their ability to maintain uniform physical properties and adequate light reflectivity or in their ability to dissipate static electrical charge build up around the belt.

BRIEF DESCRIPTION OF THE INVENTION

This invention is directed to an improved document transport belt of composite construction which is electrically conductive and has a light reflective surface for use in a document copying machine. In particular this invention is a belt having means for dissipating static electricity comprising an outer layer of ethylene propylene rubber or ethylene propylene diene rubber containing light reflective pigments and an electrically conductive, high tensile strength inner layer of ethylene propylene rubber or ethylene propylene diene rubber containing conductive carbon black.

BRIEF DESCRIPTION OF THE DRAWING

The FIGURE represents a perspective view of a static conducting document transport belt of the present invention.

MORE DETAILED DESCRIPTION

In order to achieve the dual objectives of providing a paper transport system which is capable of dissipating static electrical charge build up during high speed operation and also presenting a highly reflective surface to the image making portion of a copy producing device, this invention employs a specific composite structure for the belt which actually contacts and conveys the paper or document through the desired operation. This document transport belt is a part of a larger system designed to convey documents or papers from one point to another within the copying device. The apparatus may contain means for support and means for driving the document transport belt as well as other means to adjust the tension and inclination of the document transport belt.

The document transport belt contains two distinct layers which together form the composite belt 3. Referring to the FIGURE the outer layer 1 is the portion of the belt which actually contacts and conveys the document or paper. The inner layer 2 which engages the drive and support means of the document transport apparatus, (not shown). The outer layer of the improved document transport belt is made from high molecular weight, synthetic rubber polymers derived from ethylene and propylene. The copolymer rubbers (EPR) are polymerized from ethylene and propylene monomers and are completely saturated polymer backbones. The terpolymers (EPDM) are polymerized from ethylene, propylene, and a small percentage of a diene which provides unsaturation in side chains pendant from the saturated backbone. The common diene monomer component may be 1,4-hexadiene, ethylidene norbornene, or dicyclopentadiene. The compounding of EPDM to achieve desired physical properties in belts such as a stable coefficient of friction and particular tensile, elongation and elastic modulus levels is well known in the art as described in U.S. Pat. No. 4,314,006. The compounding of EPR is in all respects similar to EPDM except that EPR rubbers are not curable using sulfur or sulfur donor curing systems. The preferred cure system to be employed is one in which free radical crosslinking is carried out using commonly available peroxide curing materials such as ditertiary butyl peroxide, dicumyl peroxide, benzyl peroxide, etc. Such additional secondary curing agents as zinc 2-mercaptotlylimidazole, red lead, triallyl cyanurate, triallyl isocyanurate, difunctional acrylates and trifunctional acrylates may be utilized to achieve specific desired cured physical properties.

Plasticizers may be used in the compounding of the composition for the outer layer. Petroleum based process oils are commonly used for this purpose. The oils may be primarily paraffinic in character although naphthenic oils may be utilized in order to achieve desired physical properties. Such plasticizers may be added to the polymer at from 5 to 50 parts by weight of plasticizer based on a 100 parts by weight of EPDM or EPR. Fillers and reinforcing materials may be added to enhance the tensile strength, elongation and modulus values of the finished rubber composition. Preferred reinforcers are the hydrated silicas and aluminum oxides. For the outer layer of said belt carbon black is not an acceptable reinforcing agent since it is desired that this layer be highly light reflective. Whiteners must be added to the outer layer in order to achieve the desired level of light reflectence. The preferred whitener is titanium dioxide which may be added at levels of from 10 to 110 parts by weight based on 100 parts by weight of rubber polymer. Cure activators may be added to the rubber composition in order to enhance the rate of cure. Zinc oxide is a preferred activator and may be incorporated at levels of from 1 to 10 parts by weight.

The base polymer of the electrically conductive inner layer is EPDM or EPR rubber and may contain plasticizers, fillers, activators, and other ingredients. The polymer composition and curing system of the inner and outer layers may be the same or different. However, it is most preferred that the curing system and the EPDM or EPR polymer be the same as those employed in the outer layer. Such similarities in the base polymer and the cure system are desirable since the outer and inner layers must be securely bonded together and similar polymer and cure systems will assure secure bonding between the two layers after curing.

An essential component of the inner layer is conductive carbon black. Among the various types of carbon blacks available, acetylene blacks and selected grades of furnace blacks produced from oil feed stocks are the types which are recognized by practitioners in rubber compounding as conductive carbon blacks. The degree of electrical conductivity of a carbon black loaded rubber depends on a number of factors including the number of conductive paths provided by the black and the resistance of the carbon black particles. The chain structure and the level of combined oxygen present at the surface of the carbon black particles are factors that affect the conductivity of a particular type of carbon black. High chain structure, low oxygen carbon blacks are generally efficient conductors. A commonly used method of classifying the conductive character of a cured rubber composition is to measure the electrical resistivity (ohms-cm) of the rubber composition. For the purposes of this invention, a carbon black is considered conductive if it exhibits electrical resistivity of less than $10^6$ ohms-centimeter when incorporated in the rubber at the desired level with all other compound ingredients. Currently available carbon blacks which exhibit such resistivity include Shawinigan acetylene black available from Shawinigan Carbide Corporation, conductive furnace blacks available from Cabot Corporation, ketjen black available from Noury Chemical Corporation. The most preferred carbon blacks are the Cabot XC conductive furnace blacks. These carbon blacks exhibit specific surface areas ($N_2SA$) of about 254-125 $m^2/g$ and a dibutylphthlate (DBP) absorption range of about 178 to about 100 cc/100 g. The foregoing values represent the range of properties for conductive furnace blacks available from Cabot Corporation with the high end of the range represented by the Cabot product Vulcan XC-72 and the low end represented by Vulcan C, a conductive furnace black. Vulcan C has a $N_2SA$ of 125 $m^2/g$ and a DBP absorption of 100 cc/100g. These products are also known under the ASTM designations N472 and N293 respectively and are both considered conductive carbon blacks. The carbon black may be added at levels of from about 30 to about 120 parts by weight per 100 parts by weight of the rubber polymer.

It is desirable that the outer layer have a minimum tensile strength of 1000 psi (6.9 MPa) and minimum ultimate elongation of 200%. The inner layer is subjected to the mechanical stress of the drive means and must have higher physical properties than the outer layer. It is desirable that the inner layer have a minimum tensile strength of 1800 psi (12.4 MPa) and minimum ultimate elongation of 150%. Such properties being determined in accordance with ASTM D412.

Graphite differs from conductive carbon black in several important aspects. The density of conductive carbon black is lower. This is attributable to the three dimensional ordered crystalline structure of graphite which contrasts with the two dimensional carbon black. The completely uniform structure of graphite imparts minimal reinforcement and abrasion resistance when compounded into rubber polymers. The tensile strength is roughly 30% less than a conductive furnace type carbon black. These deficiencies in physical properties make graphite an unacceptable conductive material in the inner layer of the belt of this invention. Use of graphite in the inner layer would lead to abrading and fretting of the surface by the drive and support means of the document transport device. The abraded black particles would accumulate on the white belt surface, imaging window and in movable mechanical parts causing poor copy quality and premature wear of mechanical parts.

The various ingredients may be incorporated into the EPDM or or EPR polymer in any conventional manner including banbury or mill mixing. The mixing should be carried out in such a manner that all ingredients of the composition are uniformly dispersed in the base polymer.

The document handling composite belt may be produced by forming uncured sheets of desired thickness from each of the different compositions: One sheet from the outer layer composition which includes a whitening agent and one sheet from the inner layer composition which includes conductive carbon black. Such sheets may be produced by calendaring, extrusion, casting from solvent or any other suitable means. The sheets of the outer layer composition and the inner layer composition are plied together in intimate contact at the interface of the plies. The plied sheet may then be applied to a mandrel of the appropriate diameter and spliced to form a smooth surface. Heat and pressure are then applied in order to initiate curing of the base polymer in both compositions. The curing means may be any known conventional method including autoclave, compression molding, liquid curing by high temperature molten metals of salts, radiation curing, etc.

A Preferred Embodiment

A document transport belt was made using an EPDM terpolymer composed of ethylene propylene and ethylidene norbornene, specifically Vistalon 2504 available from Exxon Chemical Corporation. The outer reflective layer and inner electrically conductive layer compositions were peroxide cured. The outer reflective layer contained 95 parts titanium dioxide and 40 parts hydrated silica. The electrically conductive inner layer contained no fillers other than 75 parts by weight based on 100 parts by weight of EPDM of conductive carbon black, specifically Vulcan XC-72 type furnace black commercially available through Cabot Corporation. Vulcan XC-72 has a N2SA of 254 m$^2$/g and a DBP absorption of 178 cc/100 g. The physical properties of the outer and inner layers are summarized in Table I.

TABLE I

| PHYSICAL PROPERTIES* | | |
|---|---|---|
| | Electrically Conductive Inner Layer | Light Reflective Outer Layer |
| Tensile Strength, psi (MPa) | 2610 (18.0) | 1250 (8.6) |
| Ultimate Elongation, % | 220 | 310 |
| Shore A Durometer | 79 | 72 |
| 100% Modulus, psi (MPa) | 1770 (12.1) | 435 (3.0) |
| Tear, Die C lb/in-(kN/m) | 200 (35.2) | 177 (29.8) |

*Test sheets (1.5 mm) press cured for 30 minutes @ 166° C.

The belt was produced in the following manner: (1) The compositions as described above were banbury mixed to assure adequate dispersion of all ingredients: (2) Each of the two compositions were calendared to the appropriate gauge; (3) Laying up on a hollow rigid mandrel a first ply of the electrically conductive layer having a thickness of 0.025 inches, (0.6 mm) then laying up a second ply of the reflective layer having a thickness of 0.015 inches (0.4 millimeters). The construction was inspected carefully to assure that the two plies were in intimate contact with each other and no air spaces existed between the plies. The uncured belt construction was then cured under high pressure steam conditions and subsequently cut to the desired width to form an endless belt for use as a document transport belt in a copying apparatus. The electrical resistivity as expressed in ohms-cm was determined for each of the layers of the fully cured belt. The light reflective outer layer had a volume resistivity of $2.7 \times 10^{14}$ohm-cm and a surface resistivity of $3.5 \times 10^{13}$ohm-cm measured in accordance with ASTM D257. The electrically conductive inner layer was determined to have a volume resistivity of 2800 ohm-cm measured in accordance with British Standard (1953) BS 2044-2050, potentiometric method number 2.

Industrial Applicability

The use of this invention in modern high speed photocopying and electrostatic copying equipment allows the realization of several desirable characteristics in the document transportation devices. First the dissipation of undesirable static charge build up during high speed operations will be eliminated by the use of this invention. Paper may be removed easily and quickly from the transportation belt due to the absence of static electrical build up. The belt of this invention embodies the further desirable characteristics of the EPDM base polymer including outstanding resistance to ultraviolet radiation, ozone, and high temperature oxidation which are all present in the working environment of the belt. The physical properties of the belt are maintained over prolonged periods of operation due to its ability to resist the degrading effects of these and the resulting degradation of such properties. The desirable light reflective characteristics of the outer layer of the belt can be maintained over long periods of operation which maintains outstanding copy quality over the extended service life of this belt construction.

I claim:

1. A static conductive document transport belt having means for dissipating static electricity comprising: an outer layer of ethylene propylene rubber or ethylene propylene diene rubber, said outer layer containing light reflective pigments and an electrically conductive, high tensile strength inner layer of ethylene propylene rubber or ethylene propylene diene rubber, said inner layer containing about 30 to about 120 parts by weight per 100 parts by weight rubber of conductive carbon black having a specific surface area (N2SA) of about 254 to about 125 m$^2$/g incorporated therethrough, exhibiting resistivity of less than $10^6$ ohms-centimeter and having a minimum tensile strength of 12.4 MPa as determined according to ASTM D412.

2. A belt of claim 1 wherein said outer layer has a minimum tensile strength of 6.9 MPa and a minimum elongation of 200%, and said inner layer has a minimum elongation of 150% as determined according to ASTM D412.

3. A belt of claim 1 wherein the conductive carbon black is a conductive furnace type carbon black.

4. A self-grounding belt conveying system comprising:
   (a) an endless flexible belt comprising an outer layer of ethylene propylene rubber or ethylene propylene diene rubber, said outer layer containing light reflective pigments and an electrically conductive inner layer of ethylene propylene rubber or ethylene propylene diene rubber, said inner layer containing conductive carbon black;

(b) means for supporting and guiding said endless belt;

(c) means for driving said endless belt.

5. A self-grounding belt conveying system of claim 4 for use in handling documents in an electrostatic or photosensitive copier.

6. A belt as set forth in claim 1 wherein said inner and outer layers of said belt are cured using free radical crosslinkers selected from the group consisting of ditertiary butyl peroxide, dicumyl peroxide, benzyl peroxide.

7. A belt according to claim 3 wherein said conductive carbon black is a high chain structure, and low oxygen type carbon black.

* * * * *